US006148060A

United States Patent [19]

Collins et al.

[11] Patent Number: 6,148,060

[45] Date of Patent: Nov. 14, 2000

[54] INTEGRATED AUTOMATIC EXPOSURE CONTROL FOR PORTAL IMAGING IN RADIOTHERAPY

[75] Inventors: William F. Collins, Clayton; Francis Cheng, Palo Alto, both of Calif.

[73] Assignee: Siemens Medical Systems, Inc., Iselin, N.J.

[21] Appl. No.: 09/172,709

[22] Filed: Oct. 13, 1998

[51] Int. Cl.[7] ........................ A61N 5/10

[52] U.S. Cl. ........................ 378/65; 378/98.7

[58] Field of Search ........................ 378/65, 98.7

[56] References Cited

U.S. PATENT DOCUMENTS

| | | | |
|---|---|---|---|
| 4,628,355 | 12/1986 | Ogura et al. . | |
| 4,942,596 | 7/1990 | Eberhard et al. . | |
| 5,138,647 | 8/1992 | Nguyen et al. | 378/189 |
| 5,485,501 | 1/1996 | Aichinger . | |
| 5,509,044 | 4/1996 | Horbaschek | 378/97 |
| 5,528,655 | 6/1996 | Umetani et al. | 378/98.7 |
| 5,608,775 | 3/1997 | Hassler et al. . | |
| 5,675,624 | 10/1997 | Relihan et al. | 378/98.7 |
| 5,771,271 | 6/1998 | Iodice | 378/96 |

FOREIGN PATENT DOCUMENTS

| | | |
|---|---|---|
| WO 90/0845 A1 | 7/1990 | WIPO . |

*Primary Examiner*—Craig E. Church

[57] ABSTRACT

Method and system aspects for integrated automatic exposure control for portal imaging in radiotherapy are described. In an exemplary method aspect, the method includes controlling scanning and blanking of a target of a camera pick-up tube to capture an initial image, and analyzing the initial image to establish an initial image intensity. The method further includes utilizing the initial image intensity to determine a time for scanning a next image, and combining a scan of the next image with the initial image to produce a portal image with a maximized signal to noise ratio.

20 Claims, 3 Drawing Sheets

INTEGRATED AUTOMATIC EXPOSURE CONTROL FOR PORTAL IMAGING IN RADIOTHERAPY

FIELD OF THE INVENTION

The present invention relates to portal imaging, and more particularly, to integrated automatic exposure control of portal imaging during radiation therapy.

BACKGROUND OF THE INVENTION

Radiation-emitting devices are generally known and used for radiation therapy in the treatment of patients, for example. Typically, a radiation therapy device includes a gantry which can be swiveled around a horizontal axis of rotation in the course of a therapeutic treatment. A linear accelerator is located in the gantry for generating a high-energy radiation beam for therapy. This high radiation beam can be an electron radiation or photon (X-ray) beam. During treatment, the radiation beam is provided on one zone of a patient lying in the isocenter of gantry rotation.

The goal of radiation treatment planning is to maximize the dose to the target volume while protecting radiation sensitive healthy tissue.

A feature of radiation therapy involves portal images, which are commonly used in radiation therapy to verify and record the patient tumor location. Portal images, i.e., images of the port through the patient through which radiation emerges, include manual (film) and electronic images (EPI) taken before or after the treatment. Electronic portal images (EPI), when taken before the treatment, give the therapist the opportunity of correcting for minor patient positioning errors. Further, EPI allows therapists to take images remotely without going inside the treatment room.

Current technology using electronic imagers generally provides poor quality images, which limits the ability to have electronic images replace film images of the portal radiation field. The poor quality is due in part to the low light levels used in the video detection of the portal radiation image (e.g., brightness levels of less than 1 lux). The low light levels result in very low signal to noise ratio images. While manual parameter adjustments of the portal imaging device may be attempted to improve image quality, these manual adjustments often introduce unacceptable time delays in patient treatment. Furthermore, more dose than necessary is typically used as a result of the indeterminate manner of delivering an amount of radiation to form the image, where a therapist relies largely on intuition to estimate how much radiation to use to obtain a properly exposed image.

Accordingly, what is needed is a method and system for automation of controlling portal image acquisition so as to maximize signal to noise ratio in the electronic image and automatically capture the EPI.

SUMMARY OF THE INVENTION

The present invention provides method and system aspects for integrated automatic exposure control for portal imaging in radiotherapy. In an exemplary method aspect, the method includes controlling scanning and blanking of a target of a camera pick-up tube to capture an initial image, and analyzing the initial image to establish an initial image intensity. The method further includes utilizing the initial image intensity to determine a time for scanning a next image, and combining a scan of the next image with the initial image to produce a portal image with a maximized signal to noise ratio and proper image intensity at minimum radiation dose.

Through the present invention, light integration on a video system and real-time level detection of the video data are combined with concurrent processing to establish a nominal dose that yields a nominal portal image during radiotherapy. The automated techniques of the present invention substantially eliminate a need for operator intervention during the image acquisition process. Less need for operator intervention further serves to minimize the dose used for achieving desirable imaging. These and other advantages of the aspects of the present invention will be more fully understood in conjunction with the following detailed description and accompanying drawings.

DETAILED DESCRIPTION OF THE INVENTION

The present invention relates to integrating automatic exposure control for portal imaging in radiotherapy. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. In the following, the invention is described with primary reference to a system for delivering X-ray radiation to a field on a patient. This is by way of example. Thus, the present invention is not intended to be merely limited to the embodiment shown but is to be accorded the widest scope consistent with the principles and features described herein.

Figure 1:
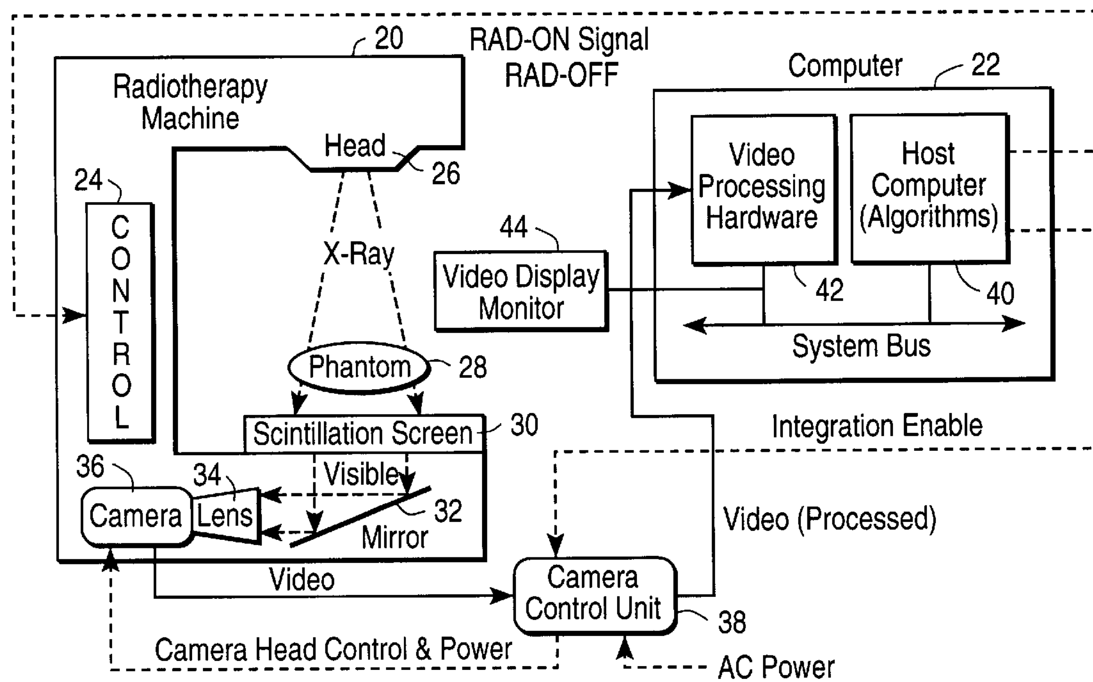
FIG. 1 illustrates a radiotherapy system with an electronic portal imager device with portal imaging control in accordance with the present invention.

FIG. 1 presents an illustrative radiotherapy system including an electronic portal imager device with portal imaging control in accordance with the present invention. The device includes a radiotherapy machine 20 controlled by a computer 22, the computer 22 sending signals to a control unit 24 for turning radiation on or off (RAD-ON or RAD-OFF). The radiation is delivered through a head 26 of the radiotherapy machine 20 to a treatment area 28 of a patient, with delimiting of the field using at least one movable plate/jaw (not shown) in the beam path, if desired. Imaging of the treatment area 28 occurs by way of a scintillation screen 30, i.e., a radiation detector comprising a metal plate and fluorescent screen, that transfers radiation energy of the treatment beam (X-RAY) passing through the treatment area 28 into visible light energy. The visible light is reflected by a mirror 32 to a lens 34 of a camera 36, e.g., a video camera. A camera control unit 38 provides camera head control and power for the camera 36, as is well understood by those skilled in the art. Further, the camera control unit 38 receives control signals from a host computer portion 40 of the computer 22 and provides video image signals for processing by a video processor 42 of the computer 22 in accordance with the present invention. Processed images are suitably displayed via a video display monitor 44.

Figure 2:
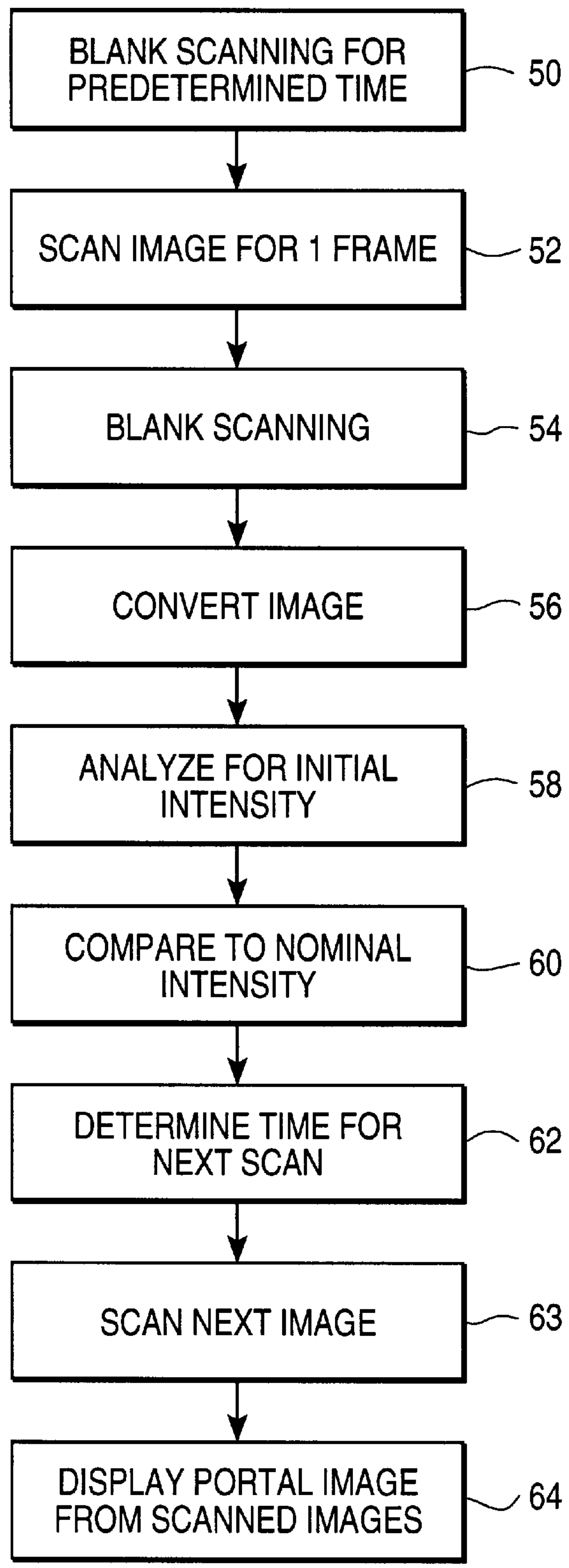
FIG. 2 illustrates a block flow diagram of a process for image capture operation in accordance with a preferred embodiment of the present invention.

FIG. 2 illustrates a flow diagram representative of a preferred method of portal image capture in accordance with the present invention. The processing described herein is preferably performed via programmed functionality stored on a suitable computer readable medium by computer 22. The process initiates by blanking the scanning of the camera 36 pick-up tube for a predetermined time period (step 50). By stopping the scanning of the pick-up tube, integration of light on the target of the pick-up tube is enabled, thus utilizing the camera's capability of image brightness integration on a pick-up tube target. The predetermined period of time is suitably a fixed period of time determined by calibration, and for example, on the order of a few milliseconds, that takes into consideration the non-linear build up of brightness in the first second of exposure due to radiation beam formation effects. Further, the RAD-ON signal capably indicates to the computer 22 the initiation of the predetermined time period.

At the end of the predetermined time period, the method continues with scanning the image for one frame (step 52). Preferably, the target of the pick-up tube is sequentially scanned from top to bottom for one video frame and transmitted to the video processor 42. The scanning of the target is then substantially immediately blanked (step 54).

The frame of image data scanned in step 52 is converted by the video processor 42 into a sample digital image and transferred into memory within the computer 22 (step 56). Analysis of the sample digital image follows to determine a value of initial image intensity (step 58), as described with reference to FIG. 3. In general, a preferred analysis involves establishment of multiple pixel regions to be analyzed for a dynamic range. After identification of values in regions that exceed a threshold, those regions are discarded and a grand summation of the remaining regions is reviewed for finding the point of 95% peak intensity through cumulative distribution analysis. The value at that point is then used as the initial intensity value.

Figure 3:
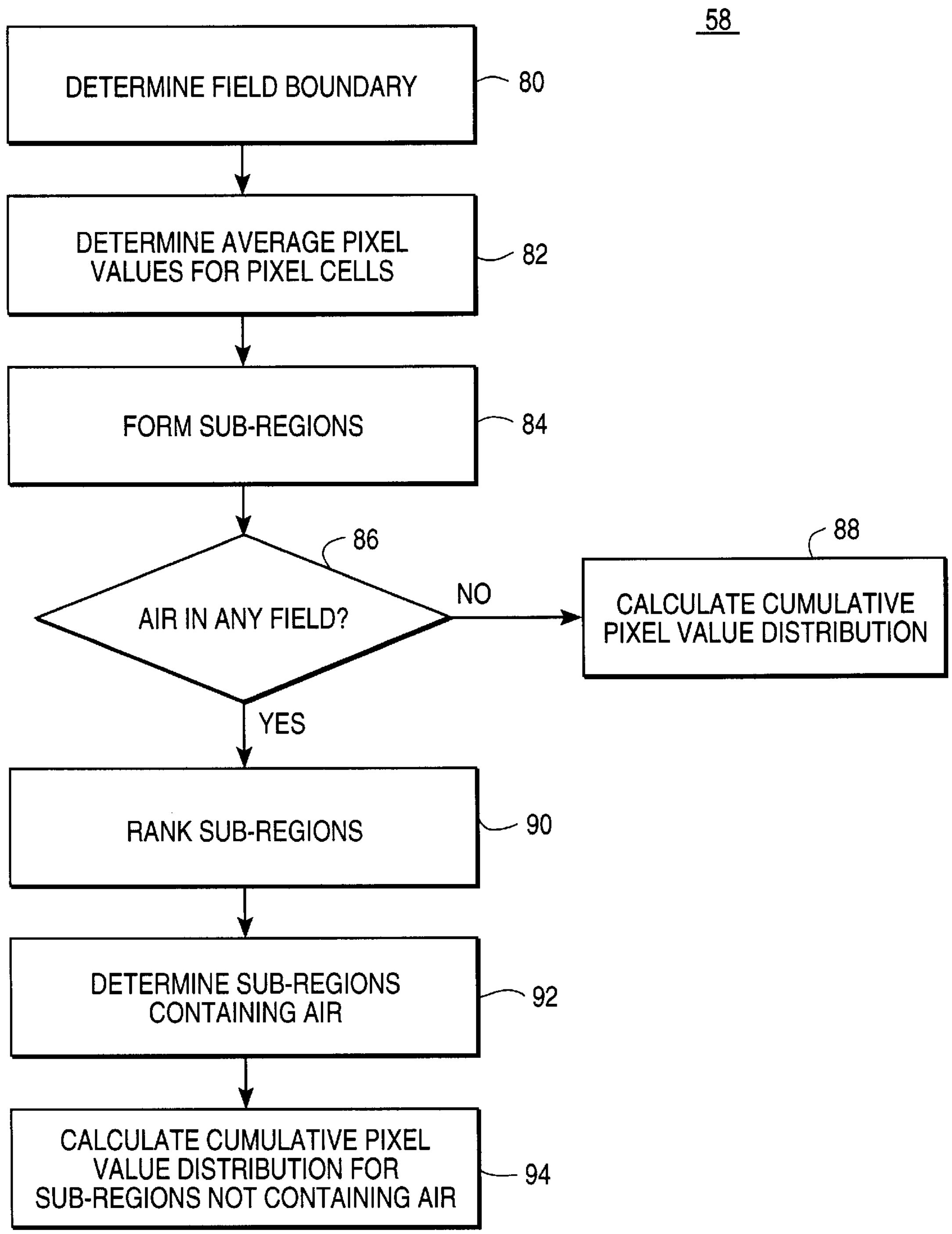
FIG. 3 illustrates a block flow diagram of a process for the step of analyzing a digital image for intensity of FIG. 2.

Referring now to FIG. 3, the intensity estimation procedure for the sample image initiates with a determination of a field boundary in image plane coordinates (step 80). The determination of the field boundary is suitably based on the collimator positions, the jaw positions and multileaf collimator (MLC) leave positions, and the beam center position, as is well appreciated by those skilled in the art. The determined field boundary identifies a region of interest that is divided into a plurality of cells, e.g., 64×64 pixel square cells, with the average pixel values within each cell computed using well known averaging techniques (step 82). Sub-regions of cells are then formed into the largest possible sub-regions (step 84), e.g., by joining neighboring cells such that for each sub-region, the average pixel value for each cell in the sub-region is within about ±15% of the total average pixel value of the sub-region.

The average pixel values of the sub-regions are compared to determine whether there exists air in the field (step 86). Air is considered in the field if a brighter sub-region's average pixel value is about 1.5 higher than the average pixel value of a darker sub-region. When there is no air in the field, i.e., step 86 is negative, the process continues with a calculation of a cumulative pixel value distribution curve for the region of interest (step 88). The 95% point of the cumulative pixel distribution curve is then suitably used as the initial image intensity.

When there is air in the field, i.e., step 86 is affirmative, the sub-regions are ranked in descending order of average pixel values (step 90). Sub-regions containing air are then determined (step 92) by identifying all sub-regions that are within about 15% of the average pixel value of the top ranked region of the ordered sub-regions. A calculation of the cumulative pixel value distribution curve for the sub-regions not containing air then occurs (step 94). The 95% point of the cumulative pixel value distribution curve is then used for the initial image intensity.

It should be appreciated that the use of 95% and 1.5 for the process of FIG. 3 is based on analysis of pixel value distributions of 15 images with various amounts of air of field, which show that the upper 95% cutoff point of the cumulative pixel distribution curve is about 1.5 times of the mean value of the cumulative pixel distribution curve. Through preliminary analysis of images with no air in field, it has been found that the upper cutoff point of the cumulative pixel distribution curve is less than about 1.15 times the mean value of the cumulative pixel distribution curve. Since the amount of air in field and the locations of air in field in portal images cannot be predicted, utilizing this way of cutting off the air in field sub-regions of a portal image aids in reliably deriving the initial image intensity.

Referring back to FIG. 2, once the initial image intensity value is determined, the initial image intensity value is compared with a pre-selected nominal intensity level value for the video signal (step 60). The pre-selected nominal intensity level value suitably refers to a preselected baseline image that is chosen off-line and that gives the best signal to noise ratio or the best balance between image signal to noise ratio and dose minimization. Of course, if the initial image intensity meets the nominal image intensity, the initial image is a sufficient portal image. If not, a time is then determined for performing a next image scan (step 62). The time determined is based on information relative to the radiation dose rate and a calculated total exposure time required to attain a maximized signal to noise ratio image, i.e., a nominal image.

A straightforward algorithm used in determining the time for the next scan comprises $(I2/I1)*T1=T2$, where I1=intensity of the sample digital image, I2=intensity of the nominal image, T1=the time required to take the sample digital image, and T2=the time required to take the nominal image. Thus, the intensity value from the sample digital image is inverted, and multiplied by the intensity value of the nominal image. The result of that is then multiplied by the sample image exposure time to determine the exposure time required to take the nominal image, i.e., the exposure time necessary to have a nominal image capture for the current conditions. By subtracting the time used to take the sample image (T1) and some latency time from the total time required to take the nominal image (T2), the actual time that the second scan of the camera pick-up tube is determined. Optionally, the time determined may also be used to signal the radiotherapy machine control 24 to terminate radiation production at that time. The latency time preferably takes into consideration the time between the sample image scan and the triggering of the next image scan.

For more complex situations, such as where linearity of the radiation dose rate cannot be assumed, a compensation factor may be added to the equation or a look-up table may be used to map out non-linear characteristics.

Once the time for scanning a next image is determined, a next image scan of one frame occurs to generate the next image (step 63). The nominal portal image is then displayed from the combination of the sample scanned image and the next scanned image (step 64), such as by adding them together.

It should be appreciated that although time has been used in the calculations for nominal image intensity, dose may also be used. The dose may be obtained from the dosimetry section of the radiotherapy machine 20, such that the dose value at T1 can be used instead of T1 in the proportion equation, and the target dose can be used as the trigger value for the second read out of the camera pick-up tube. In either approach, the present invention capably integrates control of nominal portal imaging with radiotherapy control to allow radiation to be ceased once a proper image intensity has been reached, which reduces the dose delivered to the patient during imaging and substantially eliminates reliance on therapist intuition.

Figure 4:
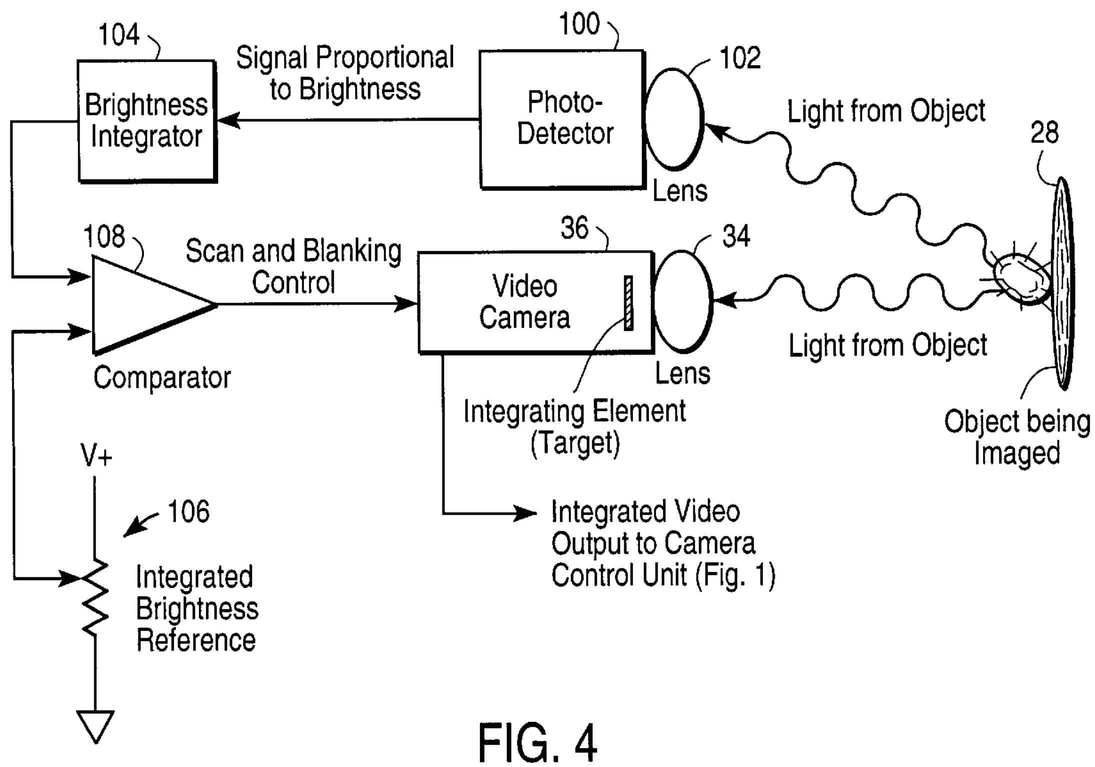
FIG. 4 illustrates an alternate hardware embodiment for the image capture operation in accordance with the present invention.

Further, in an alternate embodiment, a hardware system may be utilized for sampling brightness in order to establish a time at which to scan the camera 36, as represented by the block diagram of FIG. 4. In the hardware circuit, the light through treatment area 28 is transmitted to a photodetector 100 via a lens 102, as well as to the lens 34 of the camera 36. The signal from the photodetector 100 is proportional to the brightness, i.e., intensity of the image, which is integrated by a standard electronic integration circuit as a brightness indicator 104. The signal from the indicator 104 is compared with a nominal image brightness 106 via comparator 108. The nominal image brightness is suitably determined through service engineer calibration to establish a reference for comparison. The signal from comparator 108 is then used to send a signal that activates the scanning of the video camera 36. An integrated video output signal is provided from the camera 36 to the camera control unit 38. Thus, the hardware embodiment provides a one-step process of achieving output of a nominal image by controlling the scanning of a video camera based on intensity level comparison.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for integrated automatic exposure control for portal imaging in radiotherapy, the method comprising:

controlling scanning and blanking of a target of a camera pick-up tube to capture an initial image;

analyzing the initial image to establish an initial image intensity;

utilizing the initial image intensity to determine a time for scanning a next image; and combining a scan of the next image with the initial image to produce a portal image with a maximized signal to noise ratio.

2. The method of claim 1 wherein controlling scanning and blanking further comprises stopping the scanning of the camera pick-up tube for a predetermined time period, scanning the pick-up tube for one frame at the end of the predetermined time period, and stopping the scanning until the time for scanning the next image.

3. The method of claim 1 wherein analyzing further comprises determining a field boundary in image plane coordinates, determining average pixel values for pixel cells of a region of interest within the field boundary, and forming sub-regions of the pixel cells based on the average pixel values of the pixel cells.

4. The method of claim 3 further comprising determining whether air in field exists in the sub-regions, and calculating a cumulative pixel value distribution curve when there is no air in field determined, and identifying the initial image intensity as a 95% point of the cumulative pixel value distribution curve.

5. The method of claim 4 further comprising ranking the sub-regions in descending order of average pixel value when air in field is determined, and identifying sub-regions containing air based on sub-regions that fall within about 15% of an average pixel value of a top-ranked sub-region of the ranked sub-regions.

6. The method of claim 5 further comprising calculating a cumulative pixel value distribution curve for the sub-regions not containing air, and identifying the initial image intensity as a 95% point of the cumulative pixel value distribution curve.

7. The method of claim 1 wherein utilizing further comprises comparing the initial image intensity to a nominal image intensity.

8. The method of claim 7 wherein utilizing further comprises inverting the initial image intensity value, multiplying the inverted initial image intensity by the nominal image intensity, and multiplying by a time for exposure of the initial image to determine an exposure time required to take the nominal image.

9. The method of claim 8 further comprising subtracting the time for exposure of the initial image and a chosen latency time from the exposure time to determine the time for scanning the next image.

10. An integrated system for automatic exposure control for portal image capture during radiation therapy to maximize a signal to noise ratio in the portal image, the system comprising:

a radiotherapy machine for delivering radiation to a treatment area and including an integrated portal imager for capturing a portal image of the treatment area and including a control unit and a camera with a camera pick-up tube; and a computer coupled to the radiotherapy machine and the control unit, the computer for signalling the control unit to control scanning and blanking of a target of the camera pick-up tube to capture an initial image, for analyzing the initial image from the camera to establish an initial image intensity, for utilizing the initial image intensity to determine a time for scanning a next image, and for combining a scan of the next image with the initial image to produce the portal image with a maximized signal to noise ratio.

11. The system of claim 10 wherein the computer further signals the control unit for stopping the scanning of the camera pick-up tube for a predetermined time period, scanning the pick-up tube for one frame at the end of the predetermined time period, and stopping the scanning until the time for scanning the next image.

12. The system of claim 10 wherein the computer further analyzes the initial image by determining a field boundary in image plane coordinates, determining average pixel values for pixel cells of a region of interest within the field boundary, and forming sub-regions of the pixel cells based on the average pixel values of the pixel cells.

13. The system of claim 12 wherein the computer further determines whether air in field exists in the sub-regions, calculates a cumulative pixel value distribution curve when there is no air in field determined, and identifies the initial image intensity as a 95% point of the cumulative pixel value distribution curve.

14. The system of claim 13 wherein the computer further ranks the sub-regions in descending order of average pixel value when air in field is determined, and identifies sub-regions containing air based on sub-regions that fall within about 15% of an average pixel value of a top-ranked sub-region of the ranked sub-regions.

15. The system of claim 14 wherein the computer further calculates a cumulative pixel value distribution curve for the sub-regions not containing air, and identifies the initial image intensity as a 95% point of the cumulative pixel value distribution curve.

16. The system of claim 10 wherein the utilizing of the computer further comprises comparing the initial image intensity to a nominal image intensity.

17. The system of claim 16 wherein the utilizing of the computer further comprises inverting the initial image intensity value, multiplying the inverted initial image intensity by the nominal image intensity, multiplying by a time for exposure of the initial image to determine an exposure time required to take the nominal image, and subtracting the time for exposure of the initial image and a chosen latency time from the exposure time to determine the time for scanning the next image.

18. The system of claim 17 wherein the computer signals the control unit to scan at the time for scanning the next image.

19. A computer readable medium containing program instructions for a process of integrated automatic exposure control for portal imaging in radiotherapy comprising:

blanking scanning of a camera pick-up tube for a predetermined time period;

scanning an image for one frame at the end of the predetermined time period;

blanking scanning;

converting the one frame into a sample digital image for transfer into memory;

analyzing the sample digital image to determine an initial image intensity;

comparing the initial image intensity with a pre-selected nominal intensity;

determining a time for performing a next image scan;

generating a next image at the time of the next image scan; and displaying a nominal portal image from a combination of the image and the next image.

20. The process of claim 19 wherein analyzing further comprises establishing multiple pixel regions for analysis of a dynamic range, discarding one or more multiple pixel regions that exceed a threshold, and reviewing a grand summation of remaining regions of the multiple pixel regions for finding a predetermined point to be used as the initial image intensity.

* * * * *